United States Patent [19]

Miyagawa

[11] Patent Number: 4,943,871
[45] Date of Patent: Jul. 24, 1990

[54] IMAGE READ-OUT AND REPRODUCING APPARATUS

[75] Inventor: Ichirou Miyagawa, Kanagawa, Japan

[73] Assignee: Fuji Photo Film Co., Ltd., Kanagawa, Japan

[21] Appl. No.: 324,882

[22] Filed: Mar. 17, 1989

[30] Foreign Application Priority Data

Mar. 19, 1988 [JP] Japan .................................. 63-66749

[51] Int. Cl.⁵ .............................................. H04N 1/12
[52] U.S. Cl. ...................................... 358/496; 358/201;
            358/206; 358/481; 250/327.2; 250/484.1
[58] Field of Search ................. 250/327.2 R, 327.2 A,
    250/327.2 B, 327.2 C, 327.2 D, 327.2 E, 327.2
    F, 327.2 G, 327.2 H, 327.2 J, 327.2 K, 327.2 L,
    459.1, 484.1 R, 484.1 B; 358/400, 401, 406, 443,
    445, 447, 448, 455, 456, 458, 464, 471, 472, 474,
    475, 480, 481, 494, 496, 497, 199, 201, 206, 296,
    302

[56] References Cited

U.S. PATENT DOCUMENTS

| | | | |
|---|---|---|---|
| 3,858,004 | 12/1974 | Mason et al. ......................... | 358/472 |
| 4,258,264 | 3/1981 | Kotera et al. ...................... | 250/484.1 |
| 4,268,868 | 5/1981 | Yokota et al. ...................... | 358/480 |
| 4,276,473 | 6/1981 | Kato et al. ................... | 250/327.2 G |
| 4,315,318 | 2/1982 | Kato et al. .......................... | 358/447 |
| 4,358,793 | 11/1982 | Hosaka et al. ....................... | 358/480 |
| 4,370,678 | 1/1983 | Kitamura ............................ | 358/480 |
| 4,387,428 | 6/1983 | Ishida et al. ........................ | 250/337 |
| 4,449,046 | 5/1984 | Zuckerman et al. ................ | 358/480 |
| 4,841,147 | 6/1989 | Saotome ............................. | 358/302 |
| 4,893,012 | 1/1990 | Agano et al. ..................... | 250/327.2 |

Primary Examiner—James J. Groody
Assistant Examiner—Randall S. Svihla
Attorney, Agent, or Firm—Sughrue, Mion, Zinn, Macpeak & Seas

[57] ABSTRACT

An image read-out and reproducing apparatus comprises a read-out device for obtaining an image signal by two-dimensionally scanning a recording medium, on which image information has been recorded, with reading light, and a reproducing device for reproducing an image from the image signal by two-dimensionally scanning a recording sheet with reproducing light. A monitor light detector detects positions of reading light and reproducing light on main scanning lines by detecting monitor light. Read out in each main scanning is started when the monitor light is irradiated onto a first position on the monitor light detector, and reproduction in each main scanning is started when the monitor light is irradiated onto a second position on the monitor light detector, so that a position at which read out is started in each main scanning with the reading light and a position at which reproduction is started in each main scanning with the reproducing light approximately coincide in the main scanning direction.

6 Claims, 3 Drawing Sheets

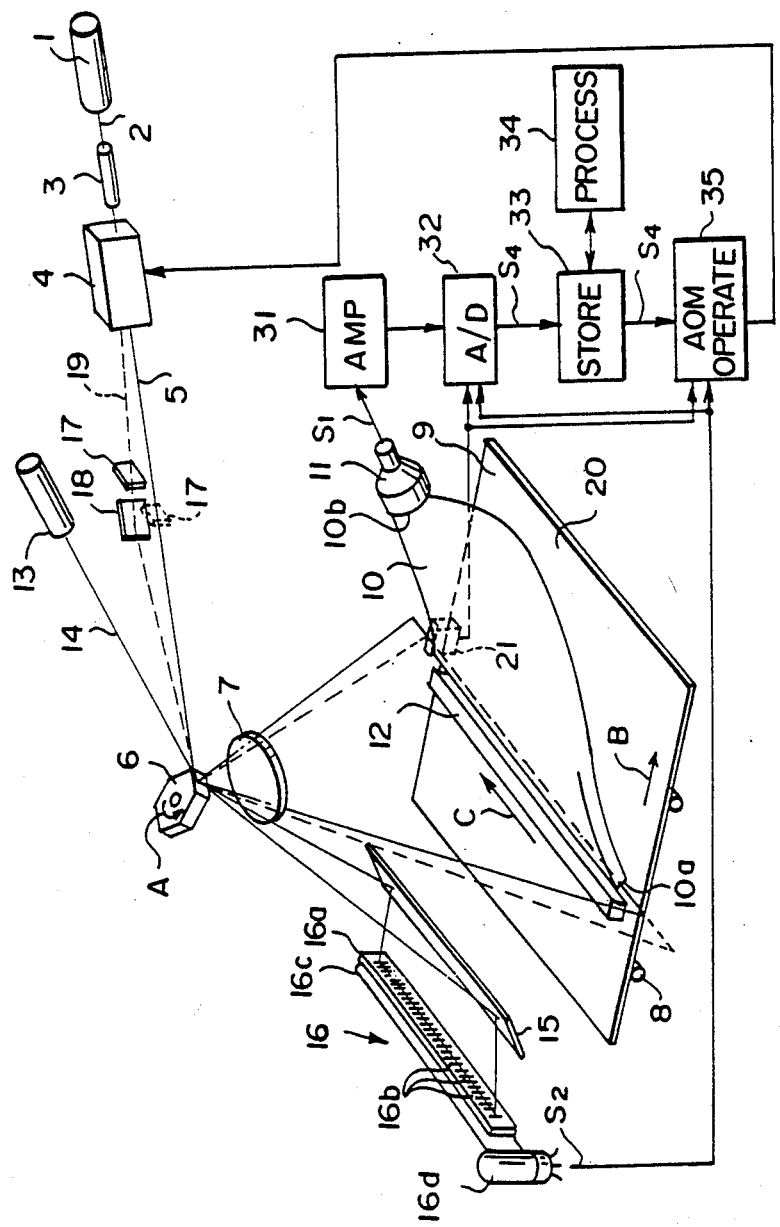

IMAGE READ-OUT AND REPRODUCING APPARATUS

BACKGROUND OF THE INVENTION

1. Field of the Invention

This invention relates to an image read-out and reproducing apparatus for obtaining an image signal by reading out image information from a recording medium, on which the image information has been recorded, and reproducing a visible image by using the image signal.

2. Description of the Prior Art

Techniques for reading out image information recorded on a recording medium in order to obtain an image signal, carrying out appropriate image processing of the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

In recent years, various attempts have been made to simplify the overall radiation image recording and reproducing system as much as possible, to make the apparatus smaller as a whole and to reduce the manufacturing cost thereof. As one of such attempts, a novel read-out and reproducing apparatus has been proposed in, for example, U.S. Patent Application No. 195,333, now U.S. Pat. No. 4,893,012. In the proposed read-out and reproducing apparatus, a read-out apparatus for obtaining an image signal by scanning a stimulable phosphor sheet, on which a radiation image of an object has been stored, with stimulating rays, and a reproducing apparatus for reproducing a visible image on a recording sheet by scanning the recording sheet with reproducing light, which has been modulated in accordance with the image signal, are combined into a single apparatus, so that both the image read out and the image reproduction is carried out by using a single scanning system.

More specifically, the read-out and reproducing apparatus proposed in U.S. Patent Application No. 195,333 is constituted so that a stimulable phosphor sheet, on which a radiation image of an object has been stored, is scanned in a main scanning direction with stimulating rays, which have been deflected by a light deflector, and is moved with respect to the stimulating rays in a sub-scanning direction which is approximately normal to the main scanning direction. When the stimulable phosphor sheet is exposed to the stimulating rays, it emits light carrying information about the stored radiation image. The emitted light is detected in order to obtain an image signal. A recording sheet is scanned in the main scanning direction with reproducing light, which has been modulated in accordance with the image signal and deflected by the light deflector, and is moved with respect to the reproducing light in the sub-scanning direction. In this manner, a visible image is reproduced on the recording sheet.

In the read-out and reproducing apparatus described above, scanning must be carried out by using stimulating rays having a predetermined amount in the course of image read out, and scanning must be carried out by using reproducing light which has been modulated in accordance with the image signal in the course of image reproduction. Accordingly, in the read-out and reproducing apparatus proposed in U.S. Patent Application No. 195,333, an acousto-optic device (hereinafter abbreviated to AOM) is inserted into the optical path of the light beam. In the course of image read out, no modulation is effected with the AOM, and main scanning is carried out by using a zero-order light component radiated from the AOM. In the course of image reproduction, main scanning is carried out by using a first-order light component which has been modulated by the AOM. This is because the power output of the zero-order light component cannot be made zero, and fog arises in a reproduced visible image when the image is reproduced by use of the zero-order light component. Therefore, the zero-order light component is not suitable as the reproducing light, and the first-order light component should be used as the reproducing light. On the other hand, in the course of the image read out, it is necessary to obtain stimulating rays having a predetermined amount and as large a power output as possible. However, the amount of the first-order light component is at the most approximately 90% of the amount of the light beam incident upon the AOM, and therefore the energy of the first-order light component is insufficient for stimulating rays.

However, the zero-order light component and the first-order light component are radiated in different directions from the AOM. Therefore, when deflection and main scanning are carried out without employing a particular means, the range over which main scanning is carried out with the zero-order light component and the range over which main scanning is carried out with the first-order light component deviate relative to each other. As a result, a visible image reproduced on the recording sheet shifts from the center portion of the recording sheet to an edge thereof, or part of the visible image is located on the outward side of the recording sheet and cannot be reproduced on the recording sheet. In order to eliminate these problems, the aforesaid read-out and reproducing apparatus is provided with an optical member, such as a mirror or a prism, which is positioned between the AOM and the light deflector. The optical member is moved between a position for image read out using the zero-order light component and a position for image reproduction using the first-order light component, so that the zero-order light component for image read out and the first-order light component for image reproduction impinge upon the light deflector along the same optical axis. In this manner, the range over which the stimulable phosphor sheet is scanned with the zero order light component in the course of image read out and the range over which the recording sheet is scanned with the first-order light component in the course of image reproduction are made to coincide with each other.

In cases where the optical member such as a mirror or a prism is moved between the position for image read out and the position for image reproduction as proposed in U.S. Patent Application No. 195,333, a mechanism for accurately moving the optical member is required, so that the scale of the read-out and reproducing apparatus becomes larger. Also, in the course of operating the accurate movement mechanism for a long period, position reproducibility of the optical member deteriorates and the optical axis thereof changes.

SUMMARY OF THE INVENTION

The primary object of the present invention is to provide an image read-out and reproducing apparatus, which eliminates the problem that, when reading light used for image read out and reproducing light used for image reproduction impinge from different directions upon a light deflector, a visible image reproduced on the recording sheet shifts from the center portion of the recording sheet to an edge thereof, or part of the visible image is located on the outward side of the recording sheet and cannot be reproduced on the recording sheet.

Another object of the present invention is to provide an image read-out and reproducing apparatus, which accurately reproduces a visible image at a predetermined position on a recording sheet.

The present invention provides a first image read-out and reproducing apparatus comprising:

(i) a read-out means for scanning a recording medium, on which image information has been recorded, in a main scanning direction with reading light which has impinged from a first direction upon a light deflector and reflected and deflected thereby, the main scanning being carried out a large number of times, moving said recording medium in a sub-scanning direction, which is approximately normal to the main scanning direction, with respect to said reading light, and obtaining an image signal by detecting light which is emitted by said recording medium during the main scanning and the sub-scanning and which carries said image information, (ii) a reproducing means for scanning a recording sheet, which is capable of reproducing image information thereon, in the main scanning direction with reproducing light which has impinged from a second direction different from said first direction upon said light deflector and reflected and deflected thereby, the main scanning being carried out a large number of times, moving said recording sheet in the sub-scanning direction with respect to said reproducing light, and reproducing an image on said recording sheet by using said image signal, and (iii) a monitor light detector extending in a direction corresponding to the main scanning direction in order to monitor positions of said reading light and said reproducing light on main scanning lines by said exposed to monitor light which has impinged from a third direction different from said first and second directions upon said light deflector and reflected and deflected thereby, and detecting said monitor light, wherein read out in each main scanning is started when said monitor light is irradiated onto a first position on said monitor light detector, and reproduction in each main scanning is started when said monitor light is irradiated onto a second position on said monitor light detector, so that a position at which read out is started in each main scanning with said reading light and a position at which reproduction is started in each main scanning with said reproducing light approximately coincide with each other in the main scanning direction.

The present invention also provides a second image read-out and reproducing apparatus wherein, instead of starting read out in each main scanning when the monitor light is irradiated onto a first position on the monitor light detector, and starting reproduction in each main scanning when the monitor light is irradiated onto a second position on the monitor light detector as in the first image read-out and reproducing apparatus in accordance with the present invention, a main-scanning start edge detector is located prior to points at which each main scanning with said reading light on the main scanning line and each main scanning with said reproducing light on the main scanning line are started, read out in each main scanning is started a predetermined time after said reading light was irradiated onto said main-scanning start edge detector, and reproduction in each main scanning is started a predetermined time after said reproducing light was irradiated onto said main-scanning start edge detector, so that a position at which read out is started in each main scanning with said reading light and a position at which reproduction is started in each main scanning with said reproducing light approximately coincide with each other in the main scanning direction.

In the image read-out and reproducing apparatus of this type, the reading light and the reproducing light impinge from different directions upon the light deflector, and reflected and deflected thereby. Therefore, the main scanning line with the reading light on the recording medium and the main scanning line with the reproducing light on the recording sheet differ in position from each other. The difference in the sub-scanning direction can be eliminated by, for example, adjustment of the location of the AOM, the location of a light source which produces the reading light and the reproducing light. However, the range over which the recording medium is scanned with the reading light in the main scanning direction and the range over which the recording sheet is scanned with the reproducing light in the main scanning direction deviate from each other. If the deviation in the main-scanning range is ignored during read out and reproduction, a visible image reproduced on the recording sheet shifts from the center portion of the recording sheet to an edge thereof, or part of the visible image is located on the outward side of the recording sheet and cannot be reproduced on the recording sheet.

With the first image read-out and reproducing apparatus in accordance with the present invention, read out in each main scanning is started when the monitor light is irradiated onto a first position on the monitor light detector, and reproduction in each main scanning is started when the monitor light is irradiated onto a second position on the monitor light detector, so that a position at which read out is started in each main scanning with the reading light and a position at which reproduction is started in each main scanning with the reproducing light approximately coincide with each other in the main scanning direction. Therefore, a visible image can be reproduced accurately at a predetermined position on the recording sheet.

With the second image read-out and reproducing apparatus in accordance with the present invention, a main-scanning start edge detector is located prior to points at which each main scanning with the reading light on the main scanning line and each main scanning with the reproducing light on the main scanning line are started, read out in each main scanning is started a predetermined time after the reading light was irradiated onto the main-scanning start edge detector, and reproduction in each main scanning is started a predetermined time after the reproducing light was irradiated onto the main-scanning start edge detector, so that a position at which read out is started in each main scanning with the reading light and a position at which reproduction is started in each main scanning with the reproducing light approximately coincide with each other in the main scanning direction. Therefore, as with the first image read-out and reproducing apparatus in accordance with the present invention, a visible image can be reproduced accurately at a predetermined position on the recording sheet.

As understood from the specification, it should be noted that the term "moving a recording medium in a sub-scanning direction with respect to reading light" as used herein means movement of the recording medium relative to the reading light in the sub-scanning direction, and embraces both the movement of the recording medium while the reading light is standing stationary in the sub-scanning direction and the movement of the reading light in the sub-scanning direction while the recording medium is standing stationary. Also, the term "moving a recording sheet in a sub-scanning direction with respect to reproducing light" as used herein embraces both the movement of the recording sheet while the reproducing light is stationary in the sub-scanning direction and the movement of the reproducing light in the sub-scanning direction while the recording sheet is stationary.

BRIEF DESCRIPTION OF THE DRAWINGS

FIG. 3 is a perspective view showing an embodiment of the second image read-out and reproducing apparatus in accordance with the present invention.

DESCRIPTION OF THE PREFERRED EMBODIMENTS

The present invention will hereinbelow be described in further detail with reference to the accompanying drawings.

Figure 1:
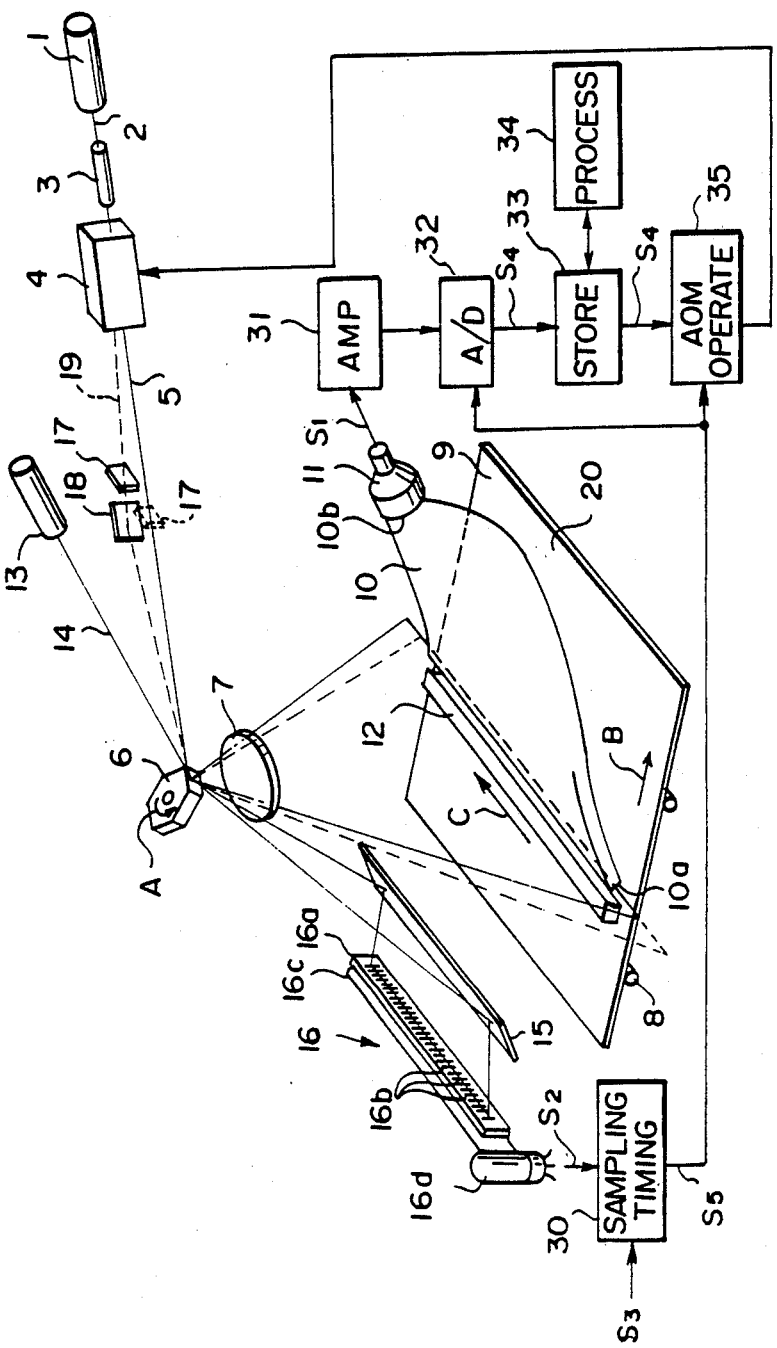
FIG. 1 is a perspective view showing an embodiment of the first image read-out and reproducing apparatus in accordance with the present invention.

With reference to FIG. 1, an embodiment of the first image read-out and reproducing apparatus in accordance with the present invention utilizes a stimulable phosphor sheet.

A laser beam 2 produced by a laser beam source 1 impinges upon a beam expander, which adjusts the beam diameter of the laser beam 2 to a predetermined value. The laser beam 2 then impinges upon an AOM (acousto-optic device) 4. A zero-order light component (reading light) 5 radiated out of the AOM 4 is reflected and deflected by a rotating polygon mirror 6 which serves as a light deflector and which is being rotated in the direction indicated by the arrow A. At this time, the AOM 4 is not activated, so that only the zero-order light component 5 is radiated out of the AOM 4. The reading light 5 which has been deflected by the rotating polygon mirror 6 passes through a scanning lens 7 constituted of an F$\theta$ lens or the like, and is caused to repeatedly scan a stimulable phosphor sheet 9, on which a radiation image has been stored, in the main scanning direction indicated by the arrow C. At the same time, the stimulable phosphor sheet 9 is moved by a conveyance means 8 in the sub-scanning direction indicated by the arrow B, which direction is approximately normal to the main scanning direction. Because the main scanning and the sub-scanning are carried out simultaneously, the overall area of the stimulable phosphor sheet 9 which is a recording medium is two-dimensionally scanned with the reading light 5.

When the stimulable phosphor sheet 9 is exposed to the reading light 5, the exposed portion of the stimulable phosphor sheet 9 emits light in proportion to the amount of energy stored during exposure to radiation. The emitted light enters a transparent light guide member 10, which has a light input end face 10a positioned parallel to the main scanning line in the vicinity of the stimulable phosphor sheet 9, from the light input end face 10a. The light guide member 10 has the flat light input end face 10a, and is formed gradually into a cylindrical shape toward the rear end side to form an approximately cylindrical rear end portion 10b. The rear end portion 10b is positioned in close contacted with a filter (not shown) which selectively transmits only light having wavelengths within the range of wavelengths of light emitted by the stimulable phosphor sheet 9 and which is in turn positioned in close contact with a photomultiplier 11. The light emitted by the stimulable phosphor sheet 9 and entering the light guide member 10 from its light input end face 10a is condensed in the rear end portion 10b and is received by the photomultiplier 11 via the filter. Also, a reflection mirror 12 extends in the main scanning direction and faces the light input end face 10a of the light guide member 10 with the main scanning line intervening therebetween. The reflection mirror 12 reflects light, which is emitted by the stimulable phosphor sheet 9 to the reflection mirror 12, toward the light input end face 10a. The photomultiplier 11 converts the detected light into an electric signal S1.

On the other hand, monitor light 14 is produced by a laser beam source 13. The monitor light 14 impinges upon the rotating polygon mirror 6 from a direction different from the directions of incidence of the reading light 5 and reproducing light, which will be described later, upon the rotating polygon mirror 6. The monitor light 14 is reflected and deflected by the rotating polygon mirror 6, reflected by a mirror 15, and then impinges upon a monitor light detector 16.

Figure 2:
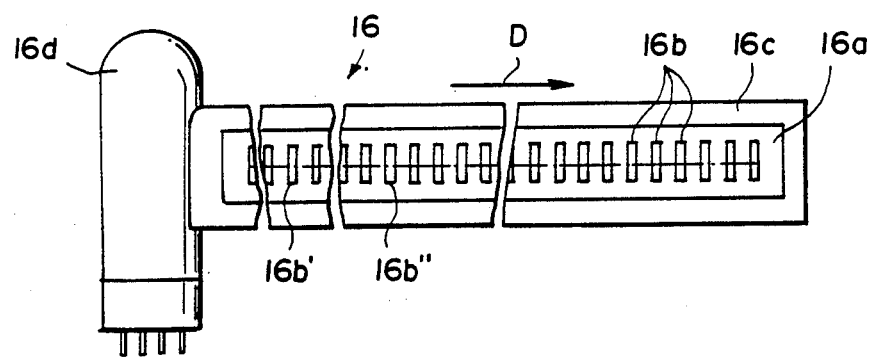
FIG. 2 is a front view showing the configuration of the monitor light detector employed in the embodiment shown in FIG. 1.

The configuration of the monitor light detector 16 will be described hereinbelow with reference to FIG. 2, which shows the monitor light detector 16 as viewed from the direction of incidence of the monitor light 14.

The monitor light 14 is caused to scan a slit plate 16a of the monitor light detector 16 in the direction indicated by the arrow D. The slit plate 16a has a plurality of slits 16b, 16b, ... standing side by side in the direction indicated by the arrow D. The monitor light 14 passes through the slit plate 16a only when the monitor light 14 is irradiated to the slits 16b, 16b, ... When the monitor light 14 is irradiated to the intermediate position between every pair of adjacent slits 16b, 16b, the monitor light 14 is intercepted by the slit plate 16a. The monitor light 14 which has passed through the slits 16b, 16b, ... enters a light guide 16c, and is guided inside of the light guide 16c to a photomultiplier 16d which converts the received monitor light 14 into an electric signal S2 which is shown in FIG. 1. The electric signal S2 is composed of pulses formed when the monitor light 14 intermittently passes through the slit plate 16a as the monitor light 14 scans the slit plate 16a.

As shown in FIG. 1, the electric signal S2 generated by the photomultiplier 16d is fed into a sampling timing signal generator 30. The sampling timing signal generator 30 also receives a switching signal S3 which switches over the operation mode between read out and reproduction. Also, the sampling timing signal generator 30 counts the pulses of the electric signal S2 during each main scanning. During read out, the sampling timing signal generator 30 outputs a predetermined number of (for example, 2,000) pulses of the electric signal S2 after, for example, the monitor light 14 has just been irradiated to a slit 16b' shown in FIG. 2 in each main scanning. During reproduction, the sampling timing signal generator 30 outputs a predetermined number of pulses of the electric signal S2 after the monitor light 14 has just been irradiated to a slit 16b'' shown in FIG. 2 in each main scanning. The slits 16b' and 16'' are selected so that the position on the stimulable phosphor sheet 9 upon which the reading light 5 is irradiated when the monitor light 14 ha been irradiated to the slit 16b' during read out and the position on a recording sheet upon which the reproducing light 19 is irradiated when the monitor light 14 has been irradiated to the slit 16b'' during reproduction approximately coincide with each other in the main scanning direction.

During read out, the switching signal S3 is set at, for example, a high level in order to activate the read-out operation mode. At this time, a shutter 17 shown in FIG. 1 is moved away from the optical path of the reading light 5 to a position indicated by the solid line.

The electric signal S1 which carries the image information and which has been generated by the photomultiplier 11 is amplified by an amplifier 31 and fed into an A/D converter 32. The A/D converter 32 samples signal components from the amplified signal, and digitizes the sampled signal components in order to obtain an image signal S4. Each signal component is sampled from the amplified signal when each of the pulses of the sampling timing signal S5, which is generated by the sampling timing signal generator 30 and which is composed of a predetermined number of (for example, 2,000) pulses generated in each main scanning, rises. The image signal S4 is stored in a storage means 33. The image signal S4 is read from the storage means 33 when necessary, and subjected to image processing in an image processing means 34.

Operations during reproduction will be described hereinbelow.

The image signal S4 is read from the storage means 33, and fed into an AOM operating circuit 35. On the other hand, the switching signal S3 fed into the sampling timing signal generator 30 is set at, for example, a low level in order to activate the reproducing operation mode. At this time, the shutter 17 is moved to a position indicated by the broken line in order to intercept the zero-order light component 5. The sampling timing signal S5 is fed from the sampling timing signal generator 30 into the AOM operating circuit 35. With the timing of reception of the sampling timing signal S5, the AOM operating circuit 35 operates the AOM 4 in accordance with the image signal S4 received from the storage means 33.

The first-order light component (reproducing light) 19 which has been radiated out of the AOM 4 is modulated in accordance with the image signal S4. The reproducing light 19 is reflected by a mirror 18, and impinges upon the rotating polygon mirror 6 from a direction different from the directions of incidence of the reading light 5 and the monitor light 14 upon the rotating polygon mirror 6. The reproducing light 19 is reflected and deflected by the rotating polygon mirror 6, and is caused to scan a recording sheet 20, which may be constituted of a sheet of photographic film or the like and which is being moved by the conveyance means 8, in the main scanning direction. In this manner, a visible image is reproduced on the recording sheet 20.

In FIG. 1, for simplicity of explanation, the stimulable phosphor sheet 9 and the recording sheet 20 are expressed as the same member. However, it will be understood that the stimulable phosphor sheet 9 is placed at its position shown during read out, and the recording sheet 20 is placed at its position shown during reproduction.

As described above, the reproducing light 19 impinges upon the rotating polygon mirror 6 from a direction different from the direction of incidence of the reading light 5 upon the rotating polygon mirror 6, and is deflected and caused to scan the recording sheet 20 in the main scanning direction. Therefore, the range over which the stimulable phosphor sheet 9 is scanned with the reading light 5 in the main scanning direction and the range over which the recording sheet 20 is scanned with the reproducing light 19 in the main scanning direction deviate from each other in the main scanning direction. However, as described above, the position at which read out is started with the reading light 5 in each main scanning and the position at which reproduction is started with the reproducing light 19 in each main scanning are adjusted so that the aforesaid deviation is eliminated during read out and reproduction. Therefore, it is possible to eliminate the problem that a visible image reproduced on the recording sheet 20 shifts from the center portion of the recording sheet 20 to an edge thereof, or part of the visible image is located on the outward side of the recording sheet 20 and cannot be reproduced on the recording sheet 20. Accordingly, a visible image can be reproduced accurately at a predetermined position on the recording sheet 20.

An embodiment of the second image read-out and reproducing apparatus in accordance with the present invention, wherein a stimulable phosphor sheet is utilized, will be described hereinbelow with reference to FIG. 3. In FIG. 3, similar elements are numbered with the same reference numerals with respect to FIG. 1.

In the embodiment shown in FIG. 1, the start of sampling of each signal component from the image signal S1 is timed by the sampling timing signal generator 30. But instead, in the embodiment shown in FIG. 3, the electric signal S2 generated by the photomultiplier 16d of the monitor light detector 16 is directly fed into the A/D converter 32 during read out, or into the AOM operating circuit 35 during reproduction. Therefore, in this embodiment, a main-scanning start edge detector 21 is provided in order to define the time at which signal sampling is to be started in each main scanning. During read out, a signal representing the time at which the reading light 5 is irradiated onto the main-scanning start edge detector 21 is fed into the A/D converter 32. The A/D converter 32 starts read out (A/D conversion) in each main scanning when the A/D converter 32 has received a predetermined number of pulses from the photomultiplier 16d after receiving the signal representing the time at which the reading light 5 is irradiated onto the main-scanning start edge detector 21. During reproduction, a signal representing the time at which the reproducing light 19 is irradiated onto the main-scanning start edge detector 21 is fed into the AOM operating circuit 35. The AOM operating circuit 35 starts reproduction (modulation of the reproducing light 19 in the AOM 4) in each main scanning when the AOM operating circuit 35 has received a predetermined number of pulses from the photomultiplier 16d after receiving the signal representing the time at which the reproducing light 19 is irradiated onto the main-scanning star edge detector 21.

In this embodiment, the main-scanning start edge detector 21 is provided in order to adjust the time at which read out is started and the time at which reproduction is started. Therefore, as in the embodiment shown in FIG. 1, it is possible to eliminate the problem that a visible image reproduced on the recording sheet 20 shifts from the center portion of the recording sheet 20 to an edge thereof, or part of the visible image is located on the outward side of the recording sheet 20 and cannot be reproduced on the recording sheet 20. Accordingly, a visible image can be reproduced accurately at a predetermined position on the recording sheet 20.

The embodiments described above are applied to systems wherein a stimulable phosphor sheet is utilized. However, the first and second image read-out and reproducing apparatuses in accordance with the present invention are also applicable to various other systems, for example, the systems wherein an image signal is obtained by reading out an image recorded on a sheet of X-ray film, and a visible image is reproduced from the image signal.

Also, in the embodiments described above, the zero-order light component and the first-order light component produced by a single laser beam source are utilized as the reading light and the reproducing light. However, the reading light and the reproducing light need not necessarily be produced by a single light source, and are not limited to the zero-order light component and the first-order light component.

I claim:

1. An image read-out and reproducing apparatus comprising:
    (i) a read-out means for scanning a recording medium, on which image information has been recorded, in a main scanning direction with reading light which has impinged from a first direction upon a light deflector and been reflected and deflected thereby, the main scanning being carried out a large number of times, moving said recording medium in a sub-scanning direction, which is approximately normal to the main scanning direction, with respect to said reading light, and obtaining an image signal representing the image information by detecting light which is emitted by said recording medium in response to the reading light during the main scanning and the sub-scanning,
    (ii) a reproducing means for scanning a recording sheet, which is capable of reproducing image information thereon, in the main scanning direction with reproducing light which has impinged from a second direction different from said first direction upon said light deflector and been reflected and deflected thereby, the main scanning being carried out a large number of times, moving said recording sheet in the sub-scanning direction with respect to said reproducing light, and reproducing an image on said recording sheet by using said image signal, and
    (iii) a monitor light detector extending in a direction corresponding to the main scanning direction in order to monitor positions of said reading light and said reproducing light on main scanning lines of the recording medium and the recording sheet, respectively, by being exposed to monitor light which has impinged from a third direction different from said first and second directions upon said light deflector and been reflected and deflected thereby, and detecting said monitor light,
    wherein read out in each main scanning is started when said monitor light is irradiated onto a first position on said monitor light detector, and
    reproduction in each main scanning is started when said monitor light is irradiated onto a second position on said monitor light detector,
    so that a position at which read out is started in each main scanning with said reading light and a position at which reproduction is started in each main scanning with said reproducing light approximately coincide with each other in the main scanning direction.

2. An apparatus as defined in claim 1 wherein said reading light and said reproducing light respectively are a zero-order light component and a first-order light component which are radiated out of a single acousto-optic device.

3. An apparatus as defined in claim 1 wherein said recording medium, on which image information has been recorded, is a stimulable phosphor sheet on which a radiation image has been stored, and said image signal is obtained by scanning said stimulable phosphor sheet with reading light, which causes said stimulable phosphor sheet to emit light in proportion to an amount of energy stored in the stimulable phosphor sheet during exposure to radiation, and detecting the light emitted by said stimulable phosphor sheet.

4. An image read-out and reproducing apparatus comprising:

(i) a read-out means for scanning a recording medium, on which image information has been recorded, in a main scanning direction with reading light which has impinged from a first direction upon a light deflector and been reflected and deflected thereby, the main scanning being carried out a large number of times, moving said recording medium in a sub-scanning direction, which is approximately normal to the main scanning direction, with respect to said reading light, and obtaining an image signal representing the image information by detecting light which is emitted by said recording medium in response to the reading light during the main scanning and the sub-scanning, (ii) a reproducing means for scanning a recording sheet, which is capable of reproducing image information thereon, in the main scanning direction with reproducing light which has impinged from a second direction different from said first direction upon said light deflector and been reflected and deflected thereby, the main scanning being carried out a large number of times, moving said recording sheet in the sub-scanning direction with respect to said reproducing light, and reproducing an image on said recording sheet by using said image signal, and (iii) a monitor light detector extending in a direction corresponding to the main scanning direction in order to monitor positions of said reading light and said reproducing light on main scanning lines of the recording medium and the recording sheet, respectively, by being exposed to monitor light which has impinged from a third direction different from said first and second directions upon said light deflector and been reflected and deflected thereby, and detecting said monitor light, wherein a main-scanning start edge detector is located prior to points at which each main scanning with said reading light on a main scanning line and each main scanning with said reproducing light on a main scanning line are started.

read out in each main scanning is started a first predetermined time after said reading light is irradiated onto said main-scanning start edge detector, and reproduction in each main scanning is started a second predetermined time after said reproducing light is irradiated onto said main-scanning start edge detector, so that a position at which read out is started in each main scanning with said reading light and a position at which reproduction is started in each main scanning with said reproducing light approximately coincide with each other in the main scanning direction.

5. An apparatus as defined in claim 4 wherein said reading light and said reproducing light are respectively a zero-order light component and a first-order light component which are radiated out of a single acousto-optic device.

6. An apparatus as defined in claim 4 wherein said recording medium, on which image information has been recorded, is a stimulable phosphor sheet on which a radiation image has been stored, and said image signal is obtained by scanning said stimulable phosphor sheet with reading light, which causes said stimulable phosphor sheet to emit light in proportion to an amount of energy stored in the stimulable phosphor sheer during exposure to radiation, and detecting the light emitted by said stimulable phosphor sheet.

* * * * *